Figure 7:
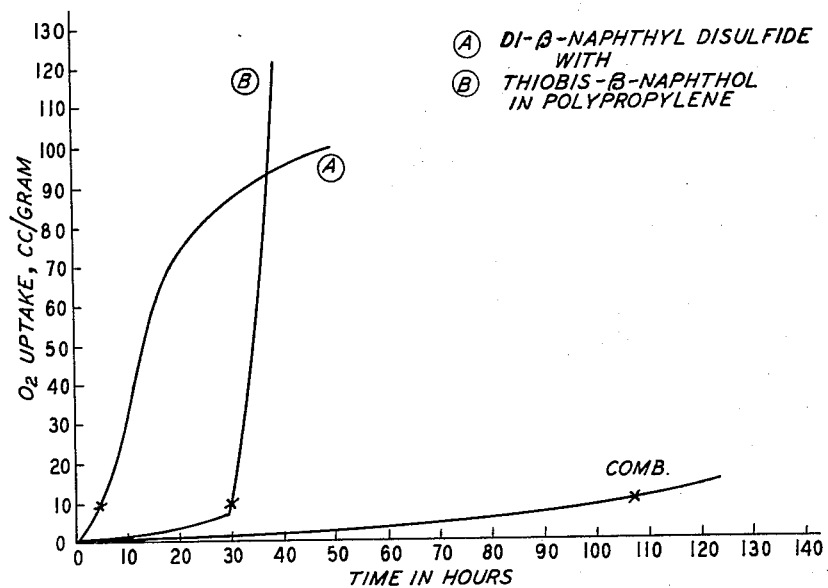

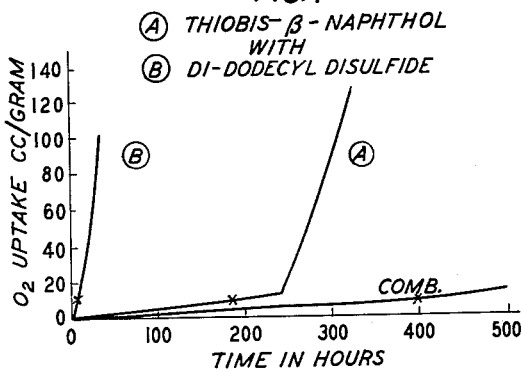
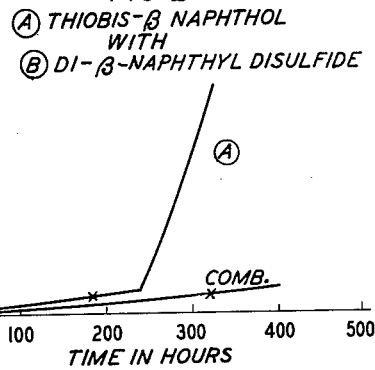
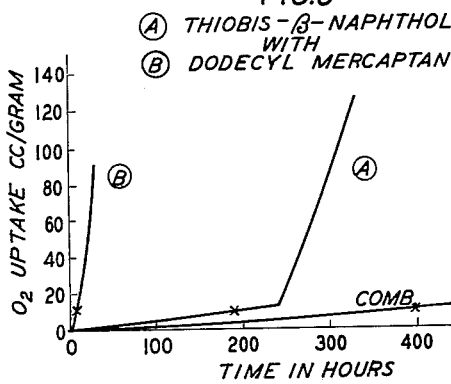
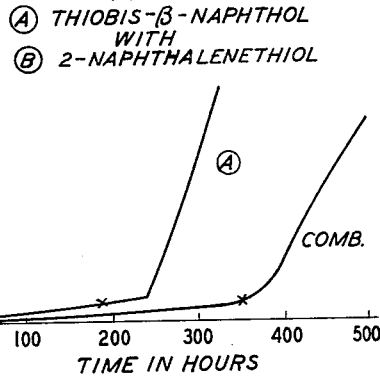
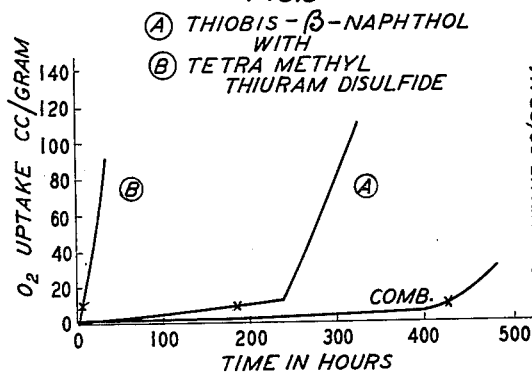
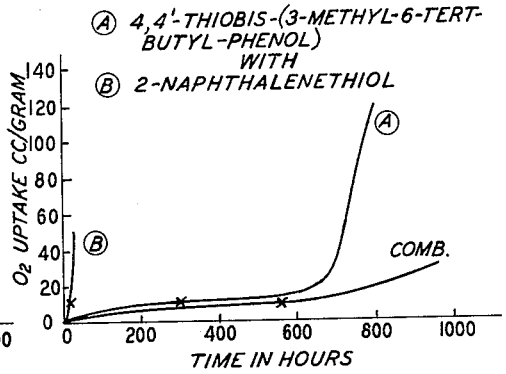

Nov. 9, 1965 W. L. HAWKINS ETAL 3,216,967
POLYOLEFINS STABILIZED WITH SULFIDES AND THIOBISPHENOLS
Filed Jan. 9, 1961 2 Sheets-Sheet 2

(A) DI-β-NAPHTHYL DISULFIDE WITH
(B) THIOBIS-β-NAPHTHOL IN POLYPROPYLENE (A) POLYETHYLENE AND
(B) POLYPROPYLENE ALONE

INVENTORS W. L. HAWKINS
M. A. WORTHINGTON
BY
ATTORNEY

United States Patent Office 3,216,967
Patented Nov. 9, 1965

3,216,967
POLYOLEFINS STABILIZED WITH SULFIDES
AND THIOBISPHENOLS
Walter L. Hawkins, Montclair, N.J., and Mary Ann
Worthington, Bridgeport, Conn., assignors to Bell
Telephone Laboratories, Incorporated, New York,
N.Y., a corporation of New York
Filed Jan. 9, 1961, Ser. No. 81,550
3 Claims. (Cl. 260—45.9)

This invention relates to stabilized polymeric materials. Further, it relates to essentially saturated hydrocarbon polymeric materials having included therein small amounts of additives which have been found to exhibit a retarding effect on deleterious oxidation of the material. This invention is primarily directed to inhibiting so-called thermal oxidation in polymers by the addition of certain combinations of organic materials which have been found to produce a synergistic effect.

Considerable study has been devoted to the effects and prevention of thermal oxidation in the more common saturated polymers, particularly polyethylene and polypropylene. Thermal oxidation, as concerned with here, is oxidation normally occurring in ordinary atmospheres essentially independent of ultraviolet light which varies or accelerates with increasing temperature. "Antioxidant" materials have consequently been developed which provide a marked retardation of thermal oxidation. Such antioxidants as known in the prior art characteristically required an antioxidant radical such as a secondary amino group or a hydroxyl group attached to an aromatic ring. These compounds result in a resonant stabilized structure. Typically, such compounds further contain additional substituents such as branched or normal aliphatic groups. A more thorough treatment of antioxidant materals and mechanism can be found in G. W. Whelands "Advanced Organic Chemistry," 2nd edition, chapters 9 and 10.

The particular polymeric materials adapted to be treated by this invention are polymers containing tertiary hydrogen atoms. Such polymers are of two general types; those containing random numbers and spacing of tertiary hydrogen atoms such as polyethylene and those containing ordered hydrogen atoms such as polypropylene. This invention concerns either type and mixtures thereof or copolymers containing one or more of either type. Specific compounds appropriate for this invention are polymers of olefins such as polyethylene, both conventional and the newer higher density materials, polypropylene, polybutene-1, poly-3-methyl butene-1, poly-4-methyl pentene-1, poly-4,4-dimethyl pentene-1, polydodecene-1 and poly-3-methyl pentene-1.

Although the most common polymeric materials falling within the class above outlined are the polymerization products of monomers containing four or fewer carbon atoms, polymerized products of higher order monomers, and copolymers and mixtures containing such polymers may also be stabilized in accordance with this invention. For a discussion of the oxidative mechanism against which protection is imparted in accordance with this invention, see Modern Plastics, volume 31, pages 121 to 124, September 1953.

Some of the polymeric materials included in the class above set forth have already attained considerable commercial importance; notably, polypropylene and the various types of polyethylene. Some of the other materials in this class have excellent electrical and mechanical properties and will doubtlessly find widespread use in the near future.

Many of the most important applications of polyethylene such as its use in cable sheathings, depend on its very good mechanical properties such as high tensile strength and abrasion resistance coupled with its resistant properties against water and water vapor. Other uses take advantage of its high dielectric strength in applications such as primary insulation of wire conductors. Some consequences of thermal oxidation in such polymers are an increase in the brittle point, impairment of tensile strength and poorer dielectric properties. Accordingly, successful use of these materials in applications now contemplated requires the use of good antioxidant materials.

It has been previously found that certain classes of sulfur compounds when combined with various other specific materials and incorporated in small amounts in a polymeric material exhibit a synergistic antioxidant effect. Many of these combinations compare favorably with the best commercial antioxidants. This is set forth in detail in copending applications of Hawkins et al. which were filed November 29, 1956, Serial Nos. 625,184, now abandoned, 625,577, now United States Patent No. 2,967,850 issued January 10, 1961, 625,068 now United States Patent No. 2,967,846 issued January 10, 1961, 625,110 now United States Patent No. 2,967,849 issued January 10, 1961, 625,109 now United States Patent No. 2,967,848 issued January 10, 1961, 625,108 now United States Patent No. 2,967,847 issued January 10, 1961, and 672,062 which was filed July 15, 1957, now Patent 2,889,-306, issued June 2, 1959.

We have now discovered that an additional class of compounds synergize these same classes of sulfur compounds. These are thio-bis-phenols of a specific nature as hereinafter defined.

The sulfur compounds which are synergized by these newly discovered compounds are those previously found to be synergized with carbon black and certain conjugated materials in the copending applications of Hawkins et al. above set forth. It is this class of compounds which is intended to be within the scope of the present invention. This class encompasses generally: aliphatic and aromatic disulfides, aromatic and aliphatic mercaptans and aliphatic thiuramdisulfides.

The aliphatic disulfides fall within the general formula $(R-S-S-R')_x$ in which R and R' are aliphatic radicals such as for example, butyl or higher order homologues of the alkyl series and in which one or more hydrogen atoms may be replaced by a hydrocarbon substituent or non-hydrocarbon substituent known to be inert with respect to the polymer to be stabilized such as nitrogen, and $x$ is an integer of at least 1. The R and R' moieties of these compounds may be identical or not, the only requirement additioinal to those set forth being a restriction of the number of carbon atoms in each moiety including substituents to the exclusive range of from 4 to 30. The lower limit of 4 carbon atoms is necessitated by the high vapor pressure of compounds of this class containing fewer carbons resulting in practical difficulty in introducing the material into the polymer, while the upper limit of 30 carbons is directed primarily to ease of compounding the polymeric materials and to dilution of the antioxidant effect based on the weight percentage range which is practical. A more thorough treatment of these compounds and examples thereof appears in copending application Serial No. 625,108 filed November 29, 1956 now United States Patent No. 2,967,847 issued January 10, 1961.

The aromatic disulfides of this invention include the di-cyclic-disulfides falling within the general formula R—S—S—R' in which R and R' are ring structures such for example as phenyl, naphthyl, anthryl, thiazole or other aromatic or heterocyclic radicals and S is a sulfur atom. Either or both of the cyclic moieties of these compounds may additionally contain one or more aliphatic substituents providing that the total maximum number of carbon atoms in the moiety does not exceed 30. Examples of compounds falling within this group may be found in copending application, Serial No. 625,577, now United States Patent No. 2,967,850 issued January 10, 1961.

The mercaptans within the scope of this invention fall within the general formula $R-(SH)_x$. R is either an aliphatic radical having from 6 to 30 carbon atoms including substituents or an aromatic ring structure, for instance, phenyl, naphthyl, anthryl, thiazole or other aromatic or heterocyclic groups having a maximum of 30 carbon atoms in the molecule. A more complete treatment of this group of compounds and examples thereof can be found in copending applications of Hawkins et al., Serial Nos. 625,109 and 625,110 now United States Patents Nos. 2,967,848 and 2,967,849 both issued January 10, 1961.

The aliphatic thiuramdisulfides appropriate to the invention fall within the general formula:

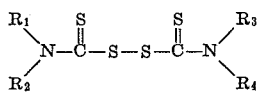

in which $R_1$, $R_2$ and $R_3$, $R_4$ are aliphatic radicals such as, for example, methyl or higher order homologues of the alkyl series and in which one or more hydrogen atoms may be replaced by a hydrocarbon substituent or other substituent, such as nitrogen, known to be inert with respect to the polymer to be stabilized. The $R_1$, $R_2$, $R_3$ and $R_4$ substituents of these compounds may be identical or not, the only additional requirement being that the sum of carbon atoms contained in each of the paired substituents $R_1$, $R_2$ and $R_3$, $R_4$ be no greater than 30. The maximum imposed on the number of carbon atoms contained in the substituents is directed primarily to ease of compounding the polymeric materials and to dilution of the antioxidant effect based on the weight percentage range which is practical. Examples of compounds falling within this group may be found in copending application Serial No. 672,062, Hawkins et al., now Patent 2,889,305, issued June 2, 1959.

Although in many instances symmetrical sulfur compounds are set forth in the above-referred-to copending applications, it should be understood that unsymmetrical compounds of the same nature are also effective.

The second component of the synergistic mixture according to the invention is a thio-bis-phenol having the general formula:

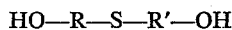

where R and R' are aromatic rings. This invention also includes the derivatives of this formula which include at least this structure. Accordingly, each radical may have additional substituents or condensed rings. The hydroxyl groups may be two or more in number and occupy any position as long as there is one for each radical.

Combinations of these two classes of compounds show a synergistic antioxidant effect which can be appreciated from an examination of the accompanying FIGURES 1 through 8. Each figure is a plot of accelerated oxidation tests on a polymeric material of the designated class protected with a particular synergistic mixture according to the invention. Each figure contains three curves, one showing the polymer containing only a sulfur compound according to the invention, one showing the polymer containing a thio-bis-phenol according to the invention, and a third showing the polymer protected with the synergistic mixture of both of these compounds. Also, control curves for the unprotected polymers have been included. The procedure used for these accelerated tests is hereinafter described.

Figure 8:
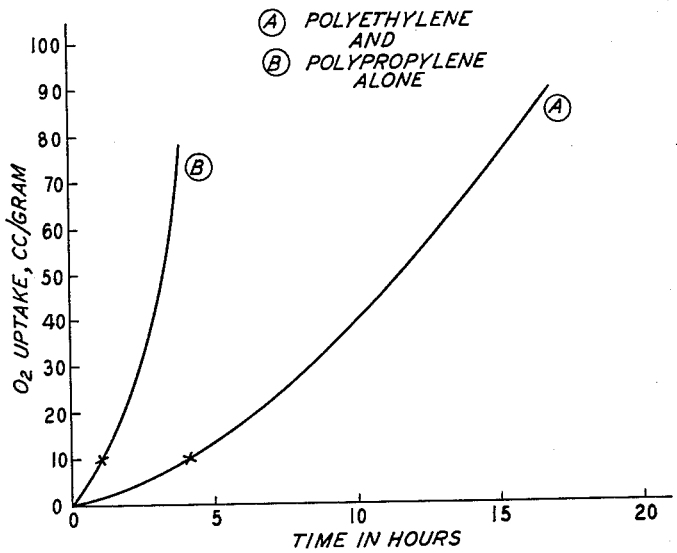

The coordinates on each figure are oxygen uptake in grams per cubic centimeter of the sample (ordinate) versus time in hours (abscissa). The oxygen uptake rate is a measure of oxidative degradation of the sample. Each of FIGS. 1–7 illustrates the antioxidant properties of a combination according to the invention. The curves designated A and B are control curves showing the stabilizing effect of each material separately. The letters A and B on the curves correspond to the compounds similarly marked. The third curve in each instance designated "COMB" is the synergistic combination of compounds A and B according to the invention. FIG. 8 is included as a control curve showing uninhibited polyethylene alone and polypropylene alone. FIGS. 1–5 are concerned with the various sulfur containing components while FIGS. 4 and 6 show the thio-bis-phenol type compound according to the invention. In FIGS. 1–5, each type of sulfur containing compound was tested with a typical thio-bis-phenol namely, thiobis-β-naphthol. FIGS. 4 and 6 show two different thio-bis-phenols tested with a single sulfur containing material, specifically, 2-naphthalenethiol. In each of FIGS. 1–6 the polymer tested was polyethylene. FIG. 7 illustrates the adaptation of the antioxidant materials of this invention to the higher order polymers, specifically, polypropylene.

The specific combinations of compounds illustrated by each figure are:

FIG. 1, thiobis-β-naphthol with an aliphatic disulfide, specifically, di-dodecyl disulfide;

FIG. 2, thiobis-β-naphthol with an aromatic disulfide, specifically, naphthyl disulfide;

FIG. 3, thiobis-β-naphthol with an aliphatic mercaptan, specifically, dodecyl mercaptan;

FIG. 4, thiobis-β-naphthol with an aromatic mercaptan, specifically, 2-naphthalenethiol;

FIG. 5, thiobis-β-naphthol with a thiuramdisulfide, specifically, tetramethyl thiuramdisulfide;

FIG. 6, 4,4' - thiobis - (3-methyl-6-tert. butyl-phenol) with 2-naphthalenethiol;

FIG. 7, thiobis-β-naphthol with di-β-naphthyl disulfide in polypropylene; and

FIG. 8, control curves showing pure uninhibited polyethylene and polypropylene alone.

The amounts of each component of the synergistic mixture are not critical; however, a minimum of 0.01% by weight of each is necessary for significant antioxidant effect. A maximum of 10% by weight of the mixture is a practical upper limit beyond which the polymer fails to retain sufficient mechanical strength. However, for economical reasons a maximum of 5% of the mixture is preferred.

It was found expedient in the experimental procedure to employ equal weight measures, 0.1% by weight, of each component; however, it appears that for each combination of component a different weight ratio based on molecular formulas may result in at least the same degree of effectiveness. However, any mixture falling within the limits above delineated—0.01% by weight of each component to a combined weight of 10%—is intended to fall within the scope of this invention.

The figures presented are representative of data taken from a standard accelerated aging test for polymeric materials. Such tests are well known and data taken therefrom is of known significance. To aid the description of this invention an outline of the accelerated testing procedure is as follows:

The saturated hydrocarbon polymer, together with a mixture of each component of the classes set forth above, was prepared by mill massing on a 6 inch by 12 inch 2 roll mill having roll speeds of approximately 24 and 35 r.p.m. with the rolls at a tempertaure of about 120° centigrade. One tenth percent of each retarder was incorporated into the polymer being tested. The polyethylene used in these studies was a commercial high molecular weight, high pressure polymer supplied by the Bakelite Company as DYNK. The polypropylene used was Profax-6501 made by Hercules Powder Company which is a virgin, uninhibited polypropylene.

Test samples weighing 0.1 gm. in the form of strips approximately 10 mils thick were cut from the polymeric material containing the antioxidant mixture. These strips were placed in a pyrex glass tube attached to a mercury monometer together with about 2 gm. of type 5–A Linde Molecular Sieve, a synthetic zeolite absorbent. The reaction vessel, after being successively evacuated and filled with oxygen to assure a complete oxygen environment, was again filled with oxygen and was placed in the air-circulating strip-heater oven maintained at 140° centigrade and of such design to insure a variation of no more than 1° centigrade throughout the volume in the oven. The reaction vessel was immediately connected to an oxygen gas burette with a short length of polyvinyl chloride tubing. After reaching a temperature equilibrium at the said temperature of about 140° centigrade, which required about 15 minutes, the system was adjusted to zero reading at atmospheric pressure. Readings of oxygen uptake were made as required at atmospheric pressure, one such reading being taken every 4 to 12 hours.

Referring again to the figures, the coordinates are oxygen-absorbed in cubic centimeters per gram of sample (as measured on the mercury-filled monometer) on the ordinate and time in hours on the abscissa. The plotted data was taken from runs in which the polymeric samples were maintained at a temperature of 140° centigrade.

In interpreting curves such as these, it is here assumed that the useful properties of polyethylene and other polymeric materials included in the class previously set forth are not critically affected until the amount of oxygen absorbed by the polymer is of the order of .5% by weight. This is equivalent to about 10 cubic centimeters of oxygen absorbed in the ordinate units. Using this value of 10 cc./gm. sample, which is denoted by a cross on each curve, it is readily apparent that each figure shows a significant synergistic effect in the curve representing the mixture of compounds according to the invention.

Another factor often considered in evaluating antioxidant action is the length of the "induction" period. This is the period at which the antioxidant appears to break down completely offering no further effect so that the polymer appears to absorb oxygen at its normal uninhibited rate. The induction period is obtained by extrapolating the curve beyond the point where a significant upswing in $O_2$ absorption occurs, i.e., point X in FIG. 1 back to the abscissa. The value obtained, Y in FIG. 1 about 230 hours, is a measure of the length of time the antioxidant is effective. As is seen, some of the figures show curves which fail to show an induction period. However, in many of the curves it is evident that the synergism reflected by the increase in induction periods is even greater than that reflected in the other standard, i.e., oxygen absorption of 10 cc./gm. of sample. This suggests that perhaps by varying the amounts or ratio of the materials added, significant additions to the protected life of the polymer are possible.

Whereas specific compounds and groups of compounds have been herein set forth as appropriate for either component of the inventive synergistic antioxidant mixture, they are not intended as limiting the scope of this invention. It will be apparent to those skilled in the art that any compound having the same general character as those specifically set forth can be employed without departing from the scope of the appended claims.

What is claimed is:
1. A composition stabilized against oxidative degradation comprising a normally solid polymer of an alpha-olefin having incorporated therein at least two components including a first component selected from the group consisting of
aromatic disulfides having the general formula

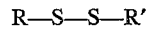

in which R and R' are ring structures each containing at least six carbon atoms and in which the maximum number of carbon atoms in each of the said ring structures including alkyl substituents is 30,
alkyl disulfides having the general formula

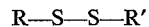

in which R and R' are alkyl radicals each containing from 4 to 30 carbon atoms;
aliphatic mercaptans having the general formula

in which R is an alkyl radical containing from 6 to 30 carbon atoms, and $x$ is an integer having a maximum value of two,
aliphatic thiuramdisulfides having the structure

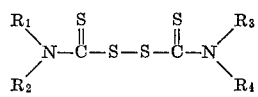

in which $R_1$, $R_2$, $R_3$ and $R_4$ are aliphatic groups and in which the total number of carbon atoms contained in each of the substituent pairs $R_1$, $R_2$ and $R_3$, $R_4$ is from 2 to 30,
and mixtures thereof, and a second component selected from the group consisting of phenols which are characterized by the general formula:

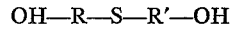

wherein R and R' are aromatic rings,
said components being included in an amount of at least .01% by weight and the total amount of both components does not exceed 10% by weight.
2. The composition of claim 1 wherein the hydrocarbon polymeric material comprises polyethylene.
3. The composition of claim 1 wherein the hydrocarbon polymeric material comprises polypropylene.

References Cited by the Examiner
UNITED STATES PATENTS

| | | | |
|---|---|---|---|
| 2,582,510 | 1/62 | Stiratelli | 260—45.7 |
| 2,647,887 | 8/53 | Goppel | 260—45.7 |
| 2,889,306 | 6/59 | Hawkins et al. | 260—45.9 |
| 2,951,821 | 9/60 | Kesling | 260—45.95 |
| 2,953,542 | 9/60 | Stark et al. | 260—45.95 |
| 2,967,845 | 1/61 | Hawkins et al. | 260—45.7 |
| 2,967,847 | 1/61 | Hawkins et al. | 260—45.7 |
| 2,967,848 | 1/61 | Hawkins et al. | 260—45.7 |
| 2,982,756 | 5/61 | Mercier et al. | 260—45.95 |
| 2,985,617 | 5/61 | Salyer et al. | 260—45.95 |

FOREIGN PATENTS 1,201,217  7/59  France.

LEON J. BERCOVITZ, *Primary Examiner.*

ABRAHAM RIMENS, DONALD E. CZAJA,
*Examiners.*